Oct. 21, 1958  C. J. McDOWALL ET AL  2,856,957
PRESSURE OPERATED VALVE

Filed Jan. 18, 1956  2 Sheets-Sheet 1

INVENTORS
Charles J. McDowall &
BY Robert J. Wente
E. W. Christen
ATTORNEY

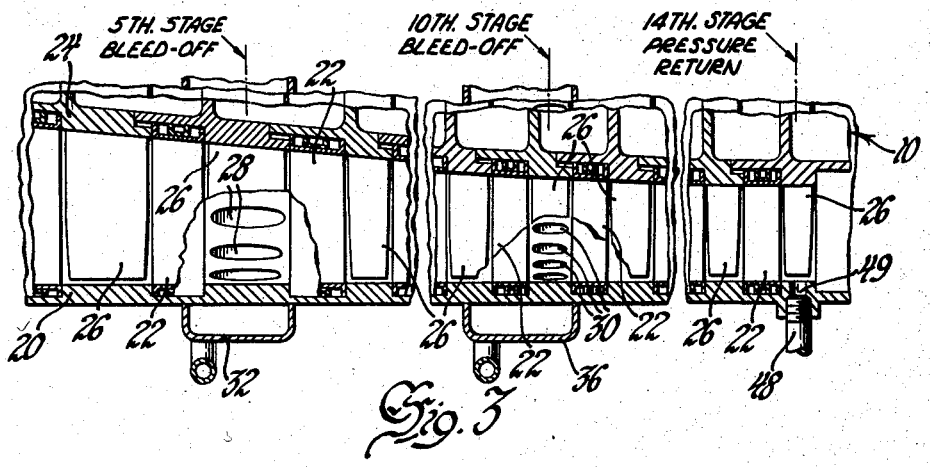
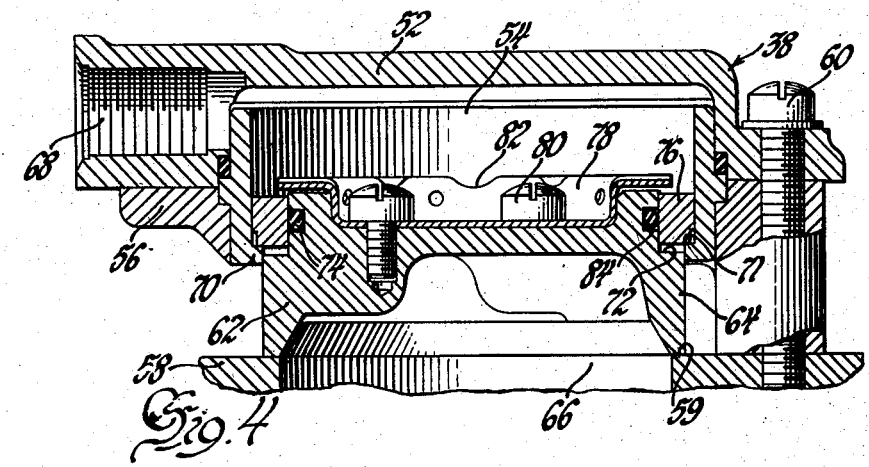
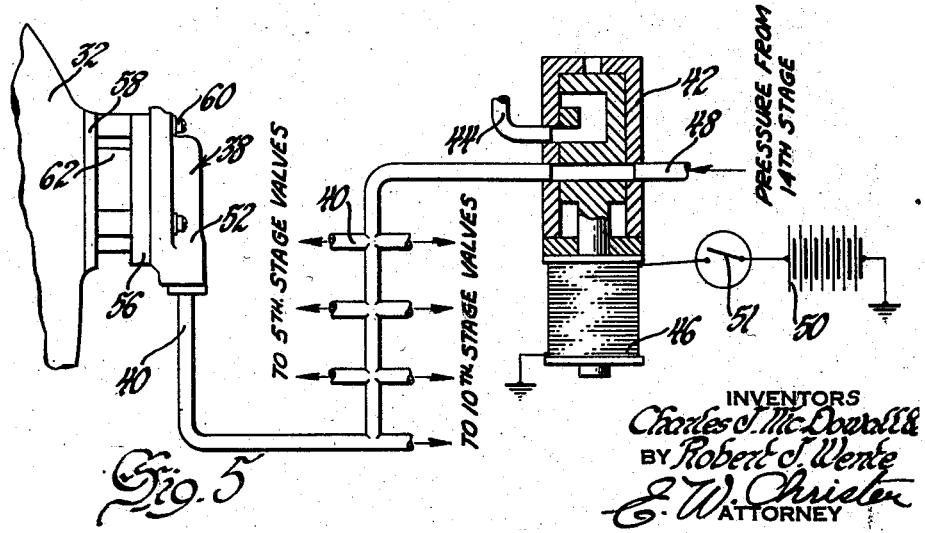

United States Patent Office

2,856,957
Patented Oct. 21, 1958

2,856,957

PRESSURE OPERATED VALVE

Charles J. McDowall and Robert J. Wente, Indianapolis, Ind., assignors to General Motors Corporation, Detroit, Mich., a corporation of Delaware Application January 18, 1956, Serial No. 559,818

7 Claims. (Cl. 137—528)

This invention relates to pressure operated valves and more particularly to an air bleed-off valve for the compressor of a gas turbine engine.

When a gas turbine engine utilizes an axial flow compressor with a large number of stages it is desirable to provide some means for bleeding off compressed air at one or more of the intermediate stages during starting and low speed operation. A gas turbine engine usually operates at a substantially uniform high speed and the compressor and turbine blading of the engine are accordingly designed for high speed operation. A multistage axial flow air compressor tends to load up during starting and low speed operation of the engine as the blading is not designed for these operating conditions. Better performance may be had during starting and low speed operation by releasing a portion of the compressed air from intermediate stages directly to atmosphere.

An object of the invention is to provide a suitable air bleed-off valving arrangement for a high speed multistage axial flow air compressor.

A further object of the invention is to provide an air bleed-off valve that is actuated by the pressure differential between different stages of the compressor and that incorporates a sealing arrangement which insures against pressure fluid leakage when the valve is closed.

Further objects and advantages of the present invention will be apparent from the following description, reference being had to the accompanying drawings, wherein a preferred form of the present invention is clearly shown.

In the drawings:

Figure 3 is a partial section taken substantially on the plane indicated by the line 3—3 of Figure 2;

Figure 4 is a cross section of the inventive air bleed-off valve taken substantially on the plane indicated by the line 4—4 of Fig. 2; and Figure 5 is a schematic of a pressure fluid control means for the air bleed-off valve.

Figures 1, 2:
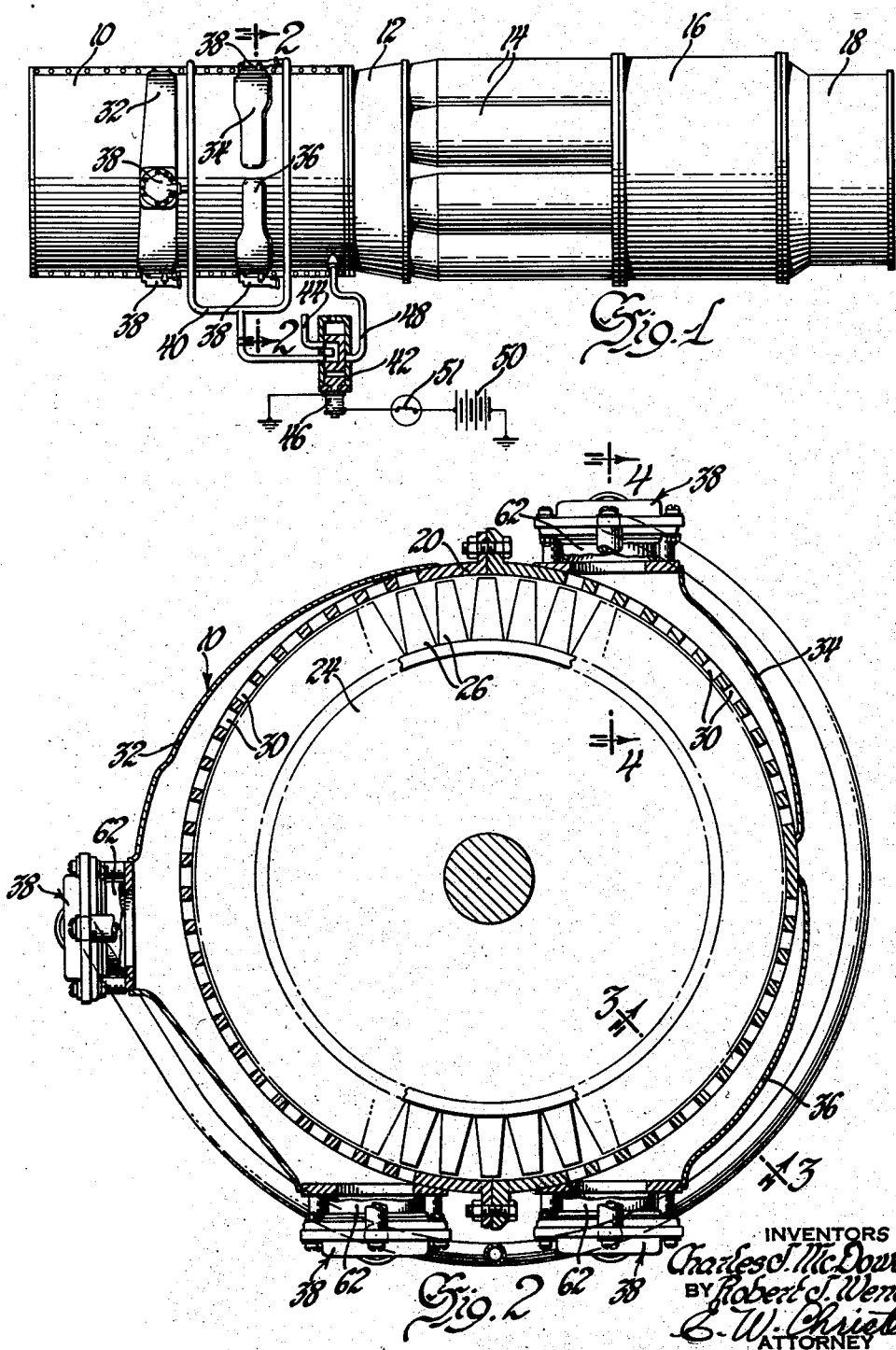
Figure 1 is a side elevation of an aircraft gas turbine engine incorporating the invention.
Figure 2 is a partial section through an intermediate stage of the compressor portion of the engine taken substantially on the plane indicated by the line 2—2 of Figure 1.

Referring now to the drawings and more particularly to Figure 1, the gas turbine engine is of a known type and includes a multi-stage axial flow air compressor 10 that discharges through a diffuser 12 into a plurality of cannular combustion chambers 14. An axial flow turbine 16 is drivingly connected to the compressor 10 and receives the products of combustion from the combustion chambers 14 and discharges to atmosphere through an exhaust nozzle 18.

Referring to the remaining figures, the compressor 10 includes a split outer casing 20, a plurality of axially spaced stator vane assemblies 22, a rotor 24 and a plurality of annular rows of rotor blades 26. Annular rows of air bleed-off ports 28 and 30 penetrate the casing 20 at the 5th and 10th pressure stages for respective communication with a pair of peripheral bleed-off manifolds each of which includes three arcuate sections 32, 34 and 36. Four piston type air bleed-off valves 38 are provided for each of the manifolds so that a substantial quantity of compressed air may be discharged during starting.

The bleed-off valves 38 are pressure loaded towards open position by 5th or 10th stage manifold pressure acting on one side of a piston 62 and are opened or closed by subjecting the other side of the piston to atmospheric pressure or to 14th stage pressure. Conduits 40 connect each of the valves 38 to a control valve 42 which vents the manifold side of the piston 62 to an atmospheric conduit 44 on energization of a solenoid 46 or connects the manifold side of the piston to a pressure conduit 48 that is tapped to 14th stage pressure through a casing bore 49. A battery 50 energizes the solenoid through a switch 51 which may be connected to a suitable speed sensitive device to close at low engine speeds where compressor bleed-off is required. Fig. 1 shows the control valve 42 in position to vent the bleed valve actuator and Fig. 5 shows the control valve in position to pressurize the actuator.

The invention is particularly concerned with eliminating air leakage at the bleed-off valves 38 during normal engine operation. Each valve 38, as best seen in Fig. 4, has a housing that includes a cylinder head 52, a cylinder 54, a three-legged cylinder ring 56, and an annular valve seat 58 assembled together by bolts 60. The piston 62 has a valve portion 64 that projects from the cylinder 54 to seat against the valve seat 58 at 59. Bleed-off air from the 5th or 10th stage manifold can escape to atmosphere between the three legs of the cylinder ring 56 from a valve seat discharge port 66 when the piston 62 is raised in the cylinder 54. The piston 62 is raised or lowered in the cylinder 54 by transmitting 14th stage pressure or atmospheric pressure to the upper side of the piston through the conduit 40 which connects to the valve housing through a passage 68; the lower side of the piston being subject to the 5th or 10th stage pressure by way of the valve seat discharge port 66. The differential pressure between the high and intermediate stages is substantial and achieves a firm seating of the valve portion 64 on the valve seat 58. The valve seal at 59 positively prevents leakage when the piston 62 is down as it comprises complementary surfaces which are forcibly engaged with each other. The differential pressure between the intermediate pressure stages and atmosphere is substantial and readily raises the piston 62 to bleed-off position when the solenoid valve 42 vents the upper side to atmosphere.

The bleed-off valve 38, with the elements thus far described, would be subject to 14th stage pressure leakage between the piston 62 and cylinder 54 in the normal closed position of the valve due to the large pressure differential between the upper side of the piston and atmosphere. Elimination of such leakage around the periphery of the piston is a primary purpose of the invention and is achieved by the sealing means to be described.

The cylinder 54 is provided with an inwardly projecting annular flange or shoulder 70 of substantially the same diameter as the major diameter of the piston 62. An annular recess 72 is located at the upper end of the piston 62 and a peripheral groove 74 is located at the bottom of the recess. An integral piston ring 76 is mounted on the recessed end of the piston with an inner diameter substantially equal to the diameter of the recess 72 and an outer diameter substantially equal to the diameter of the cylinder 54. The piston ring 76 is of slightly lesser width than the recess 72 so that it may move axially with respect to the piston. A retainer disk 78 is secured to the upper side of the piston 62 by screws 80 and projects outwardly of the bottom of the recess 72 to limit the axial movement of the piston ring 76. The retainer plate 78 is peripherally corrugated, as at 82, so that the entire upper side of the piston 62 is subject to the pressure in the cylinder 54 when the piston engages the cylinder head 52 in up position. The piston ring 76 seats axially against the cylinder flange 70 at 71 when the bleed-off valve is in closed position to positively seal against 14th stage pressure leakage past the outer diameter of the piston ring. The 14th stage pressure acts on the upper side of the piston ring 76 to seat it axially against the flange 70. This positive seal prevents leakage as it comprises complementary surfaces which are forcibly engaged with each other and is highly advantageous as a sliding seal, such as that provided between the outer diameter of the piston ring and the inner diameter of the cylinder, and is inherently subject to leakage.

Manufacturing tolerance and operating temperature differential in the valve 38 can cause variance in the axial distance between the bleed-off valve seat 58 and the cylinder flange 70, but a positive seal is achieved at 59 and 71 due to the reciprocal mounting of the piston ring 76 in the recess 72. A pliant packing ring 84 of circular section is located in the peripheral groove 74 to positively seal against 14th stage pressure leakage past the inner diameter of the piston ring 76. The groove 74 is of slightly lesser depth and greater width than the packing ring 84 so that the packing ring is compressed between the piston and ring to form a positive seal. The packing ring 84 is preferably fashioned from a composition of silicone and Teflon so as to retain flexibility at high temperatures.

While the bleed-off valve has been described fully in a particular compressor environment in order to explain the principles of the invention, and while the preferred physical embodiment of the bleed-off valve has been described in detail, it is to be understood that the valve is useful in other applications and that modifications in structure within the scope of the invention may be made by the exercise of skill in the art.

We claim:

1. A fluid pressure actuator comprising a cylinder with an inwardly projecting annular flange, a piston extending through the flange and having an annular recess, a piston ring in the recess adapted to seat axially against the flange to positively seal against fluid leakage past the outer diameter of the piston ring, the piston ring being mounted in the recess for limited reciprocal movement to allow seating to occur at different piston positions, and sealing means in the recess between the piston ring and piston to seal against fluid leakage past the inside diameter of the piston ring.

2. A fluid pressure actuator comprising a cylinder with an inwardly projecting annular flange, a piston extending through the flange and having an annular recess, a piston ring in the recess adapted to seat axially against the flange to positively seal against fluid leakage past the outer diameter of the piston ring, the piston ring being mounted in the recess for limited reciprocal movement to allow seating to occur at different piston positions, and a pliant ring in the recess compressed between the piston ring and piston to positively seal against fluid leakage past the inside diameter of the piston ring.

3. A fluid pressure actuator comprising a cylinder with an inwardly projecting annular flange, a piston extending through the flange and having an annular recess and a peripheral groove at the bottom of the recess, a piston ring in the recess adapted to seat axially against the flange to positively seal against fluid leakage past the outer diameter of the piston ring, the piston ring being of slightly lesser width than the recess so as to be reciprocal therein and thereby allow seating to occur at different piston positions, and a flexible ring of circular section in the groove compressed between the piston ring and piston to positively seal against fluid leakage past the inside diameter of the piston ring.

4. A compressor bleed-off valve comprising a housing having a valve seat and an actuating cylinder with an inwardly projecting annular flange, a valve for the valve seat, an actuating piston for the valve extending through the flange and having an annular recess, a piston ring in the recess adapted to seat axially against the flange with the valve in closed position to positively seal against actuating fluid leakage past the outer diameter of the piston ring, the piston ring being mounted in the recess for limited reciprocal movement to allow ring seating to occur despite variance in the closed position of the valve, and sealing means in the recess between the piston ring and piston to seal against fluid leakage past the inside diameter of the piston ring.

5. A compressor bleed-off valve comprising a housing having a valve seat and an actuating cylinder with an inwardly projecting annular flange, a valve for the valve seat, an actuating piston for the valve extending through the flange and having an annular recess, a piston ring in the recess adapted to seat axially against the flange with the valve in closed position to positively seal against actuating fluid leakage past the outer diameter of the piston ring, the piston ring being mounted in the recess for limited reciprocal movement to allow ring seating to occur despite variance in the closed position of the valve, and a pliant packing ring in the recess compressed between the piston ring and piston to positively seal against actuating fluid leakage past the inside diameter of the piston ring.

6. A compressor bleed-off valve comprising a housing having a valve seat and an actuating cylinder with an inwardly projecting annular flange, a valve for the valve seat, an actuating piston for the valve extending through the flange and having an annular recess and a peripheral groove at the bottom of the recess, a piston ring in the recess extending between the cylinder and piston to slidably seal against actuating fluid leakage and adapted to seat axially against the flange with the valve in closed position to positively seal against actuating fluid leakage past the outer diameter of the piston ring, the piston ring being of slightly lesser width than the recess so as to be reciprocal therein and thereby allow ring seating to occur at different piston positions, and a flexible ring in the groove compressed between the piston ring and piston to positively seal against actuating fluid leakage past the inside diameter of the piston ring.

7. A compressor bleed-off valve comprising a housing having a valve seat and an actuating cylinder facing the valve seat with an inwardly projecting annular flange, a valve for the valve seat, an actuating piston integral with the valve extending through the flange and having an annular recess and a peripheral groove at the bottom of the recess, an integral piston ring in the recess extending between the cylinder and piston to slidably seal against actuating fluid leakage and adapted to seat axially against the flange with the valve in closed position to positively seal against actuating fluid leakage past the outer diameter of the piston ring, the piston ring being of slightly lesser width than the recess so as to be reciprocal therein and thereby allow ring seating to occur despite variance in the closed position of the valve, and a pliant packing ring of circular section in the groove compressed between the piston ring and piston to positively seal against actuating fluid leakage past the inside diameter of the piston ring.

References Cited in the file of this patent

UNITED STATES PATENTS

| | | |
|---|---|---|
| 2,427,787 | Hunter | Sept. 23, 1947 |
| 2,431,437 | Van Der Werff | Nov. 25, 1947 |
| 2,607,644 | Smith | Oct. 19, 1952 |
| 2,747,954 | Damm | May 29, 1956 |